US012101461B2

(12) United States Patent
McMenamin, Jr. et al.

(10) Patent No.: US 12,101,461 B2
(45) Date of Patent: *Sep. 24, 2024

(54) MOTORIZED MOUNTING DEVICE FOR POSITIONING AN OPTICAL ELEMENT WITHIN A FIELD-OF-VIEW OF AN OPTICAL SENSOR AND METHOD OF USE

(71) Applicant: Argo AI, LLC, Pittsburgh, PA (US)

(72) Inventors: Thomas D. McMenamin, Jr., Oakmont, PA (US); Timothy S. Riggs, Latrobe, PA (US); Jack Work, Crafton, PA (US)

(73) Assignee: Argo AI, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,235

(22) Filed: Jun. 27, 2023

(65) Prior Publication Data
US 2023/0344982 A1    Oct. 26, 2023

Related U.S. Application Data

(63) Continuation of application No. 17/382,586, filed on Jul. 22, 2021, now Pat. No. 11,800,085.

(51) Int. Cl.
| | |
|---|---|
| *H04N 17/00* | (2006.01) |
| *B60W 60/00* | (2020.01) |
| *G01S 7/497* | (2006.01) |
| *G06V 10/88* | (2022.01) |
| *G06V 10/94* | (2022.01) |
| *G06V 20/56* | (2022.01) |
| *H04N 23/51* | (2023.01) |
| *H04N 23/54* | (2023.01) |
| *H04N 23/55* | (2023.01) |
| *H04N 23/57* | (2023.01) |

(52) U.S. Cl.
CPC ........ *H04N 17/002* (2013.01); *B60W 60/001* (2020.02); *G01S 7/497* (2013.01); *G06V 10/88* (2022.01); *G06V 10/94* (2022.01); *G06V 20/56* (2022.01); *H04N 23/51* (2023.01); *H04N 23/54* (2023.01); *H04N 23/55* (2023.01); *H04N 23/57* (2023.01); *B60W 2420/403* (2013.01)

(58) Field of Classification Search
CPC ...... H04N 17/002; H04N 23/51; H04N 23/54; H04N 23/57; H04N 23/55; B60W 60/001; G06V 10/94; G06V 10/88; G06V 20/56; G01S 7/497
USPC ........................................................ 348/148
See application file for complete search history.

(56) References Cited

U.S. PATENT DOCUMENTS

| | | |
|---|---|---|
| 8,063,935 B2 | 11/2011 | Leleve et al. |
| 8,139,117 B2 | 3/2012 | Dwinell et al. |
| 10,110,795 B2 | 10/2018 | Kraeling et al. |

(Continued)

*Primary Examiner* — Matthew David Kim
(74) *Attorney, Agent, or Firm* — The Webb Law Firm

(57) ABSTRACT

A mounting device for selectively positioning an optical element within a field-of-view of an optical sensor of a vehicle includes: a housing defining an opening sized to fit over an aperture of the optical sensor; a holder for the optical element connected to the housing and positioned such that, when the holder is in a first position, the optical element is at least partially within the field-of-view of the optical sensor; and a motorized actuator. The motorized actuator can be configured to move the holder to adjust the position of the optical element relative to the field-of-view of the optical sensor.

20 Claims, 11 Drawing Sheets

(56) References Cited

U.S. PATENT DOCUMENTS

| | | |
|---|---|---|
| 10,220,852 B2 | 3/2019 | Valois |
| 10,818,036 B1 | 10/2020 | Lee et al. |
| 2008/0007645 A1 | 1/2008 | McCutchen |
| 2015/0298657 A1* | 10/2015 | Kanter ................. H04N 17/002 |
| | | 348/148 |
| 2017/0006276 A1* | 1/2017 | Arndt ................... G06V 20/588 |
| 2017/0126964 A1* | 5/2017 | Fukui ................... H04N 23/633 |
| 2018/0091717 A1* | 3/2018 | Ion ......................... H04N 23/75 |
| 2018/0361998 A1* | 12/2018 | Renaud ................. G06V 20/56 |
| 2019/0281202 A1* | 9/2019 | Chen ...................... H04N 23/75 |
| 2021/0107566 A1 | 4/2021 | Seegmiller et al. |
| 2021/0108936 A1 | 4/2021 | Seegmiller et al. |
| 2021/0162962 A1* | 6/2021 | Takaki ................ B60R 21/0134 |
| 2021/0227160 A1* | 7/2021 | Aluru ................... H04N 25/633 |
| 2021/0333097 A1* | 10/2021 | Bretl ................... G01B 11/275 |

\* cited by examiner

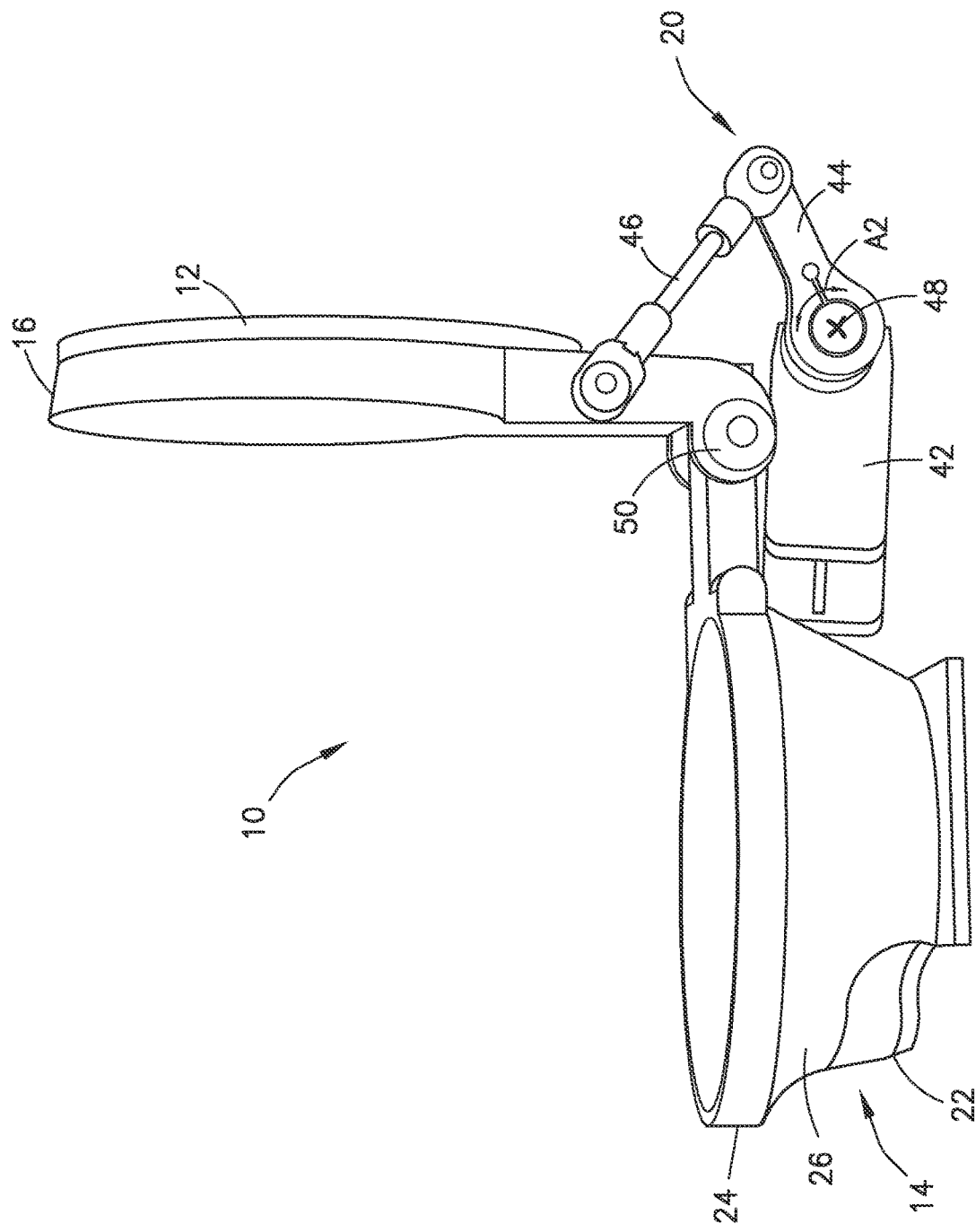

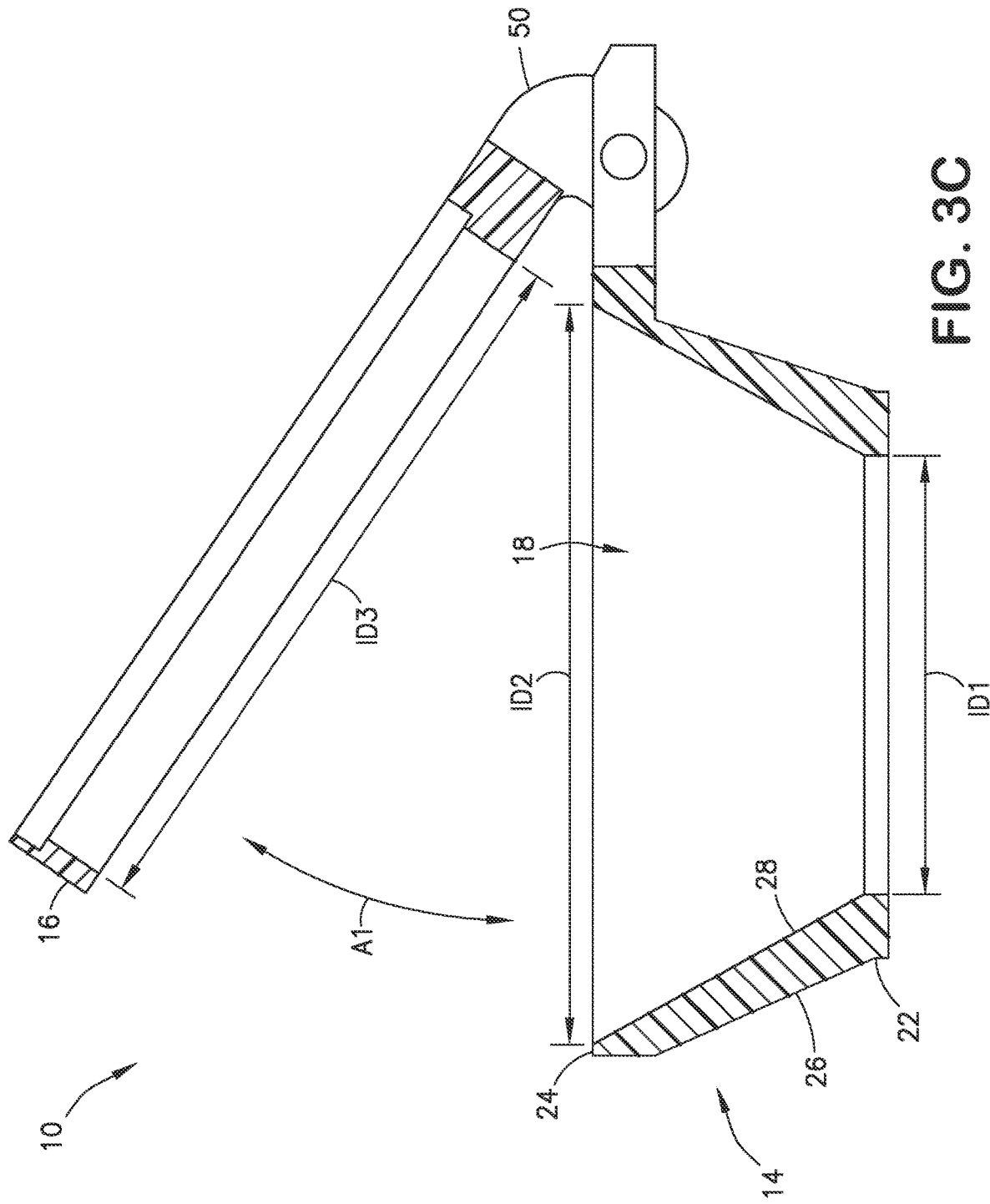

MOTORIZED MOUNTING DEVICE FOR POSITIONING AN OPTICAL ELEMENT WITHIN A FIELD-OF-VIEW OF AN OPTICAL SENSOR AND METHOD OF USE

CROSS REFERENCE TO RELATED APPLICATION(S)

This application is a continuation of, and claims priority to, U.S. patent application Ser. No. 17/382,586, filed Jul. 22, 2021, the entire contents of which are incorporated by reference herein

BACKGROUND

Field

This disclosure relates generally to accessories for use with cameras and other optical sensors of a vehicle and, in particular, to a motorized mounting device for selectively positioning an optical element within a field-of-view of the camera or optical sensor to create an image dataset that can be used for testing image analysis software and/or a perception system of the vehicle.

Description of Related Art

Accurate and consistent obstacle detection and navigation can be key elements of autonomous driving applications. Typically, an autonomous vehicle utilizes various on-board sensors to detect obstacles, other aspects of the roadway, and/or other aspects of an environment around the vehicle, which can be referred to as "perception information" or "perception data" representing what an ordinary driver would perceive in the surrounding environment of a vehicle. Examples of such sensors include, for example, one or more of vision sensors (e.g., camera(s)), radio detection and ranging (i.e., radar) sensors, and/or light detection and ranging (i.e., LiDAR) sensors.

The perception information detected by the on-board sensors is processed and analyzed by image analysis software or a perception system to identify the objects surrounding the vehicle. The objects may include, for example, traffic signals, roadway boundaries, other vehicles, pedestrians, and/or obstacles. The perception system may also determine, for one or more identified objects in an environment, the current state of the object. The state information may include, for example, an object's current speed and/or acceleration, current orientation, size/footprint, type (e.g., vehicle vs. pedestrian vs. bicycle vs. static object or obstacle), and/or other state information.

Perception systems known in the art apply different combinations of object recognition algorithms, video tracking algorithms, and computer vision algorithms (e.g., track objects frame-to-frame iteratively over a number of time periods) to determine the information about objects and/or to predict future location of objects from captured perception information and/or sensor data. In order to fully test or evaluate image analysis software and perception systems for vehicles, such as autonomous vehicles, for different cases or scenarios, there is a need to generate image datasets including obstruction cases that emulate real-world conditions. Different analysis software and systems can be tested and evaluated based on their ability to correctly detect or identify such obstruction cases. The devices, methods, and systems of the present disclosure are provided to assist in generating such image datasets for use in testing and evaluating image analysis software and perception systems.

SUMMARY

According to an aspect of the present disclosure, a mounting device for selectively positioning an optical element within a field-of-view of an optical sensor of a vehicle includes: a housing defining an opening sized to fit over an aperture of the optical sensor; a holder for the optical element connected to the housing and positioned such that, when the holder is in a first position, the optical element is at least partially within the field-of-view of the optical sensor; and a motorized actuator. The motorized actuator can be configured to move the holder to adjust the position of the optical element relative to the field-of-view of the optical sensor.

According to another aspect of the present disclosure, a kit of parts includes at least one of the previously described motorized mounting devices and a plurality of optical elements. Each of the optical elements are configured to be removably mounted to the holder of one of the motorized mounting devices.

According to another aspect of the present disclosure, a vehicle, such as a fully autonomous vehicle or a semi-autonomous vehicle, includes a plurality of optical sensors positioned to obtain images of objects and/or an environment surrounding the vehicle, and a plurality of the previously described motorized mounting devices. Each mounting device is positioned over the aperture of one of the plurality of optical sensors and is configured to move the optical element attached to the holder of the mounting device relative to the field-of-view of the respective optical sensor.

According to another aspect of the present disclosure, a system for recording images from optical sensors for testing of image analysis software or perception systems for a vehicle is provided. The vehicle includes a plurality of optical sensors positioned to capture images of objects and/or an environment surrounding the vehicle. The system includes a plurality of the previously described mounting devices, each of which is positioned over an aperture of one of the plurality of optical sensors of the vehicle. The system further includes a remote control operatively connected to each of the plurality of mounting devices configured to independently, simultaneously, and/or sequentially actuate the motorized actuators of the plurality of mounting devices.

According to another aspect of the present disclosure, a method for testing or evaluating image analysis software or a perception system of a vehicle that analyzes images collected by at least one optical sensor of the vehicle is provided. The method includes: obtaining image data of objects and/or an environment surrounding the vehicle from the at least one optical sensor of the vehicle; as the image data is being captured, causing a motorized mounting device, such as any of the previously described motorized mounting devices, to move the holder to position the optical element at least partially within the field-of-view of the at least one optical sensor, such that at least a portion of the obtained image data is distorted by the optical element; and analyzing the obtained image data using the image analysis software or perception system for analysis of images collected by the at least one optical sensor of a vehicle to determine whether the image analysis software or perception system correctly identifies portions of the image data that are distorted by the optical element.

Non-limiting illustrative examples of embodiments of the present disclosure will now be described in the following numbered clauses:

Clause 1: A mounting device for selectively positioning an optical element within a field-of-view of an optical sensor of a vehicle, the mounting device comprising: a housing defining an opening sized to fit over an aperture of the optical sensor; a holder for the optical element connected to the housing and positioned such that, when the holder is in a first position, the optical element is at least partially within the field-of-view of the optical sensor; and a motorized actuator configured to move the holder to adjust the position of the optical element relative to the field-of-view of the optical sensor.

Clause 2: The mounting device of clause 1, wherein the motorized actuator moves the holder between the first position, where the optical element is at least partially within the field-of-view of the optical sensor, and a second position where a larger area of the optical element is outside of the field-of-view of the image senor than when the holder is in the first position.

Clause 3: The mounting device of clause 1 or clause 2, wherein the vehicle comprises a semi-autonomous automobile or a fully autonomous automobile.

Clause 4: The mounting device of any of clauses 1-3, wherein the optical element comprises a lens or a filter that at least partially distorts images captured by the optical sensor.

Clause 5: The mounting device of any of clauses 1-4, wherein the optical element comprises a neutral-density filter that approximates low-light conditions.

Clause 6: The mounting device of any of clauses 1-4, wherein the optical element comprises a lens comprising an obstruction over at least a portion of a surface of the lens.

Clause 7: The mounting device of any of clauses 1-6, wherein the optical sensor comprises a digital camera comprising CCD or CMOS sensor.

Clause 8: The mounting device of any of clauses 1-7, wherein the housing comprises a first end configured to be positioned proximate to the aperture of the optical sensor, a second end opposite the first end, and an a sidewall comprising a tapered annular inner surface extending from the first end to the second end of the housing.

Clause 9: The mounting device of any of clauses 1-8, wherein the optical element is removably press fit into the holder.

Clause 10: The mounting device of any of clauses 1-9, wherein the holder is pivotally or hingedly connected to the housing, such that moving the holder comprises swinging the holder towards or away from the housing.

Clause 11: The mounting device of any of clauses 1-10, wherein the motorized actuator comprises a motor and a linking arm operatively connected between the motor and the holder, and wherein the motor rotates the linking arm causing the holder to pivot towards or away from the housing, thereby adjusting the position of the optical element relative to the field-of-view of the optical sensor.

Clause 12: The mounting device of any of clauses 1-11, further comprising a remote control operably connected to the motorized actuator configured to selectively actuate the motorized actuator to move the holder relative to the housing.

Clause 13: The mounting device of any of clauses 1-12, further comprising at least one adapter plate sized to mount the housing of the device over optical sensor apertures of different sizes.

Clause 14: A kit of parts comprising at least one mounting devices of any of clauses 1-13 and a plurality of optical elements, each of which is configured to be removably mounted to the holder of the at least one mounting device.

Clause 15: The kit of clause 14, further comprising a plurality of adapter plates configured to be mounted to the housing for attaching the mounting device to optical sensor apertures of different sizes.

Clause 16: A vehicle comprising a plurality of optical sensors positioned to obtain images of objects and/or an environment surrounding the vehicle, and a plurality of the mounting devices of any of clauses 1-13, with each mounting device positioned over the aperture of one of the plurality of optical sensors and configured to move the optical element attached to the holder of the mounting device relative to the field-of-view of the respective optical sensor.

Clause 17: The vehicle of clause 16, further comprising a frame for supporting the plurality of optical sensors so that the optical sensors are positioned to capture panoramic views of at least 180 degrees.

Clause 18: The vehicle of clause 17, wherein the frame comprises a tiara housing positioned on a roof of the vehicle, and wherein the plurality of the mounting devices are connected to a peripheral annular surface of the tiara housing.

Clause 19: The vehicle of any of clauses 16-18, comprising a semi-autonomous or fully autonomous automobile.

Clause 20: A system for recording images from optical sensors for testing of image analysis software or perception systems for a vehicle comprising a plurality of optical sensors positioned to capture images of objects and/or an environment surrounding the vehicle, the system comprising: a plurality of the mounting devices of any of clauses 1-13, each of which is positioned over an aperture of one of the plurality of optical sensors of the vehicle; and a remote control operatively connected to each of the plurality of mounting devices configured to independently, simultaneously, and/or sequentially actuate the motorized actuators of the plurality of mounting devices.

Clause 21: The system of clause 20, further comprising a data storage device operatively connected to the plurality of optical sensors configured to store high resolution data obtained by the plurality of optical sensors.

Clause 22: A method for testing or evaluating image analysis software or a perception system of a vehicle that analyzes images collected by at least one optical sensor of the vehicle, the method comprising: obtaining image data of objects and/or an environment surrounding the vehicle from the at least one optical sensor of the vehicle; as the image data is being captured, causing the mounting device of clause 1 to move the holder to position the optical element at least partially within the field-of-view of the at least one optical sensor, such that at least a portion of the obtained image data is distorted by the optical element; and analyzing the obtained image data using the image analysis software or perception system for analysis of images collected by the at least one optical sensor of a vehicle to determine whether the image analysis software or perception system correctly identifies portions of the image data that are distorted by the optical element.

Clause 23: The method of clause 22, wherein the optical element comprises a lens or a filter that at least partially distorts images captured by the optical sensor.

Clause 24: The method of clause 22 or clause 23, wherein the obtained image data approximates exiting a tunnel.

Clause 25: The method of clause 24, wherein the optical element comprises a neutral-density filter that approximates low-light conditions of a tunnel, and wherein moving the optical filter away from the optical sensor approximates the vehicle exiting the tunnel.

Clause 26: The method of any of clauses 22-25, wherein the obtained image data approximates an obstruction partially or fully covering the aperture of the at least one optical sensor.

Clause 27: The method of any of clauses 22-26, wherein causing the mounting device of clause 1 to move the holder to position the optical element at least partially within the field-of-view of the at least one optical sensor occurs manually by a user with a remote control operatively connected to the mounting device.

Clause 28: The method of any of clauses 22-26, wherein causing the mounting device to move the holder to position the optical element at least partially within the field-of-view of the at least one optical sensor occurs automatically according to a predetermined protocol.

Clause 29: The method of any of clauses 22-28, further comprising attaching the mounting device to the vehicle, such that the interior of the housing is over the aperture of the optical sensor.

Clause 30: The method of clause 29, wherein attaching the mounting device to the vehicle comprises selecting an adapter plate based on a size of the aperture of the optical sensor and attaching the adapter plate to the housing of the mounting device prior to attaching the mounting device to the vehicle.

BRIEF DESCRIPTION OF THE DRAWINGS

Additional advantages and details are explained in greater detail below with reference to the exemplary embodiments that are illustrated in the accompanying schematic figures, in which:

FIG. 2B is a side view of the motorized mounting device of FIG. 2A in a second or open position;

FIG. 3C is a cross-sectional view of the housing and holder of FIG. 3A;

DETAILED DESCRIPTION

Figure 1A:
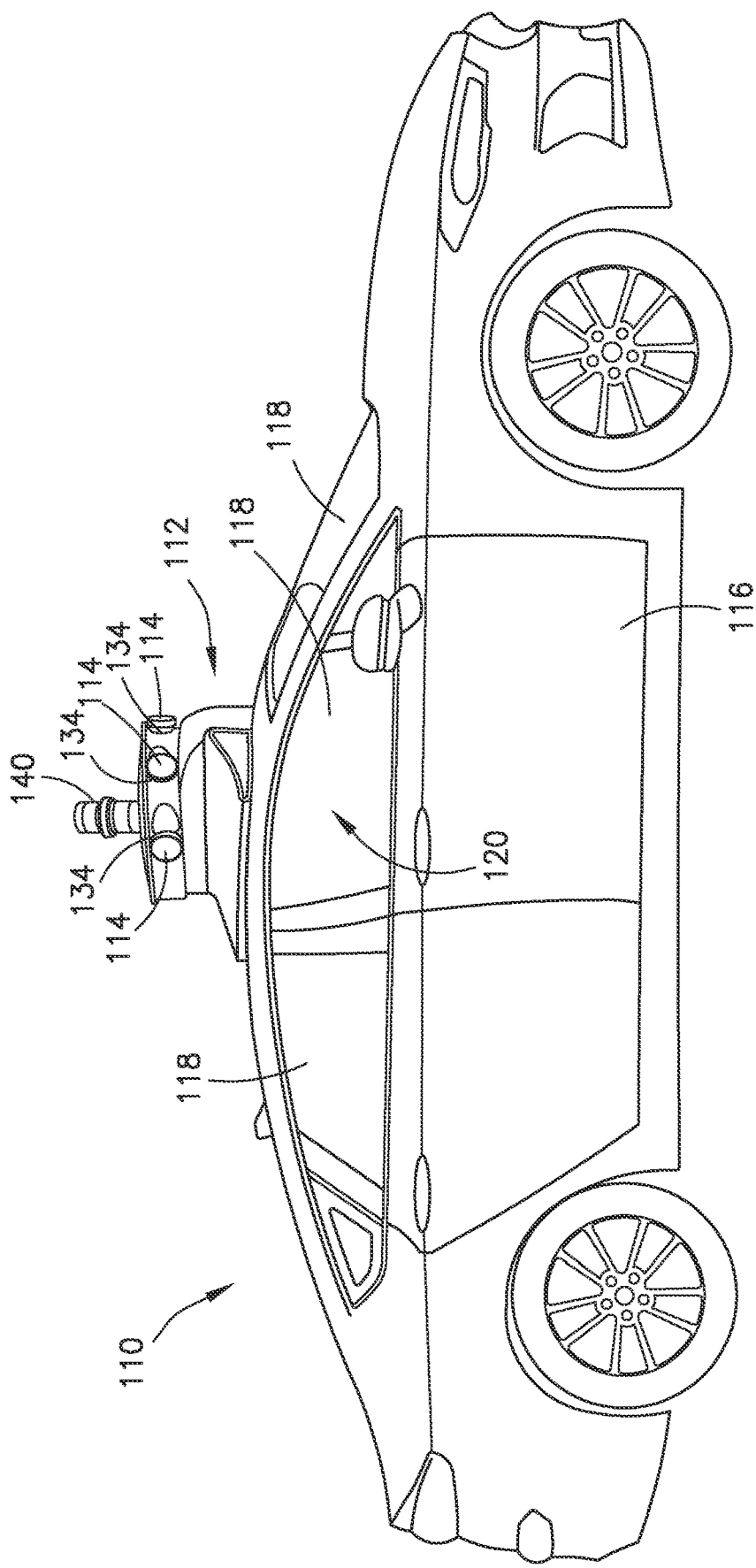
FIG. 1A is a side view of a vehicle and sensor frame supporting an array of cameras, according to an aspect of the present disclosure.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

With reference to the figures, the present disclosure is directed, in part, to a mounting device 10 for selectively positioning an optical element 12 within a field-of-view of an optical sensor 114. The mounting device 10 can be used with one or more vision sensors or cameras of a vehicle 110, such as a fully autonomous or semi-autonomous vehicle, to create datasets of captured images including distortions provided by the optical element 12. In some examples, the vehicle 110 can include multiple optical sensors 114, such as an array of multiple cameras, with different mounting devices 10 positioned over apertures and/or within a field-of-view of each of the multiple optical sensors 114.

The mounting device 10 selectively positions the optical element 12 within the field-of-view of the optical sensor 114 by, for example, pivoting, sliding, swinging, or otherwise moving the optical element 12 towards, or away from, the optical sensor 114 as image data is being collected by the optical sensor 114. The optical sensors 114 or cameras can be positioned at any convenient location on the vehicle 110, such as, for example, on a sensor frame, housing, tripod, or another support structure that positions optical sensors 114 or cameras to obtain different views of an environment surrounding the vehicle 110. For example, optical sensors 114 or cameras can be positioned to obtain a 180 degree, 270 degree, or 360 degree panoramic views of the environment. As described in further detail herein, the optical element 12 can be a filter or lens including an obstruction or another feature that distorts images captured by the optical sensor 114. By selectively positioning the optical element 12 within the field-of-view of the optical sensors 114, image data can be generated that includes the distortions of the filter or lens created on demand, such that the captured dataset includes distorted images at known or predetermined times and for predetermined durations. The captured dataset can be processed and analyzed to test image analysis software and/or a vehicle perception system and, in particular, to determine whether the software or perception system correctly detects and/or appropriately classifies image data captured when the optical element 12 is in place within the field-of-view of the optical sensor 114.

In some examples, the optical element 12 can be selected to emulate or represent obstructions present in image data collected during real-world use of the vehicle 110 and associated cameras. For example, as described in further detail herein, the image analysis software or system can be configured to detect when obstructions (i.e., dust, dirt, waste, leaves, mud, scratches, bird poop, insects, rain drops, etc.) are present in captured image data. Once the software or perception system determines that certain distortions in captured images are caused by obstructions and not, for example, by an oncoming obstacle, appropriate action can be taken. In other examples, the optical elements 12 can include light filters to approximate driving scenarios that cause significant and/or sudden changes in light intensity or brightness in captured images as occurs, for example, when the vehicle exits a tunnel. By applying different image analysis algorithms to the captured datasets, users can evaluate which software or perception systems correctly identify or trigger for portions of the dataset collected when the optical element 12 is positioned within the field-of-view of the sensor 114. Accordingly, the motorized mounting devices 10 of the present disclosure can be used to generate useful datasets of captured images. The datasets can be processed or analyzed to test or optimize image analysis software and perception systems.

Vehicle and Sensor Frame

Figure 1B:
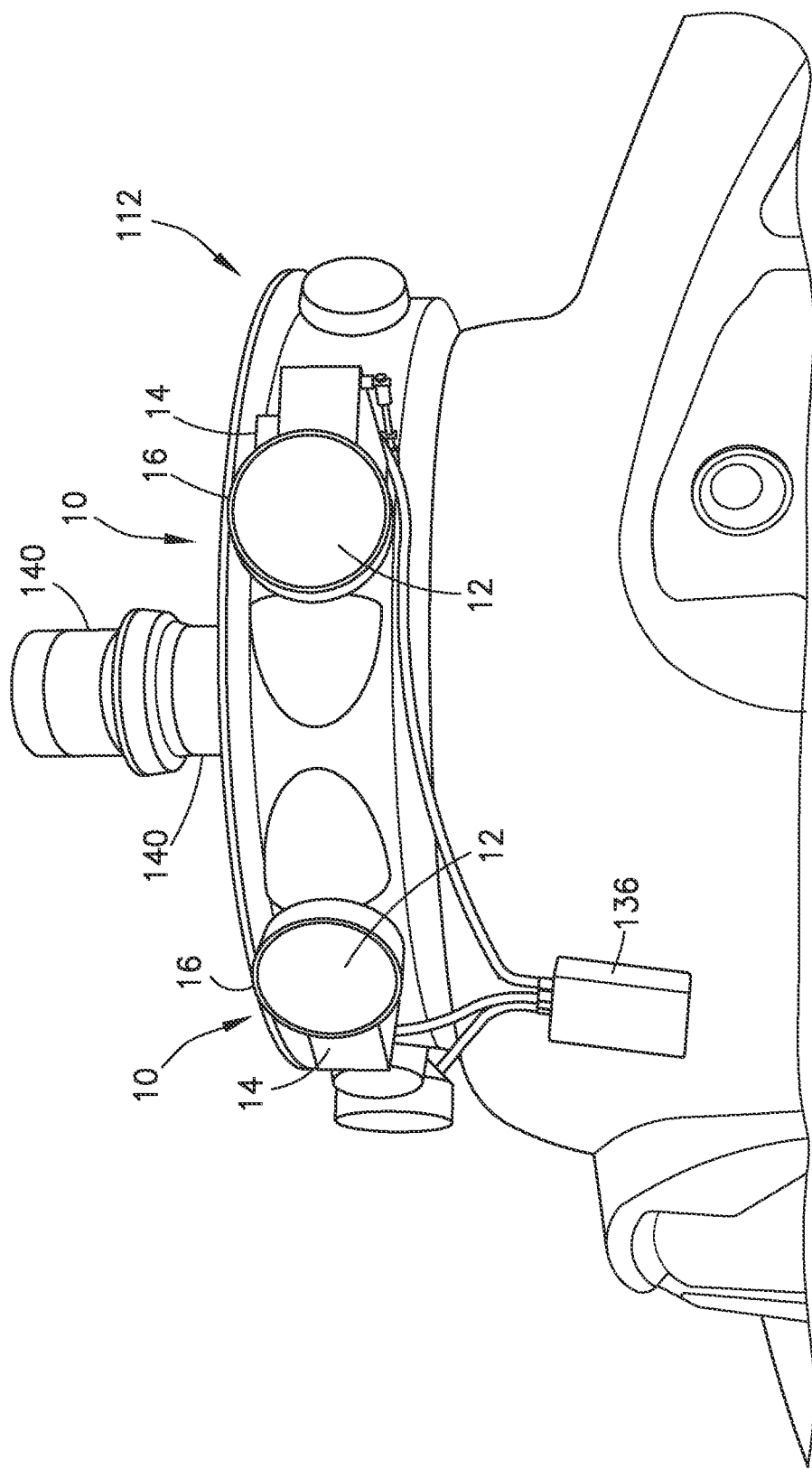
FIG. 1B is an enlarged view of the frame and array of cameras of FIG. 1A with motorized mounting devices mounted to the sensor frame, according to an aspect of the present disclosure.
Figure 1C:
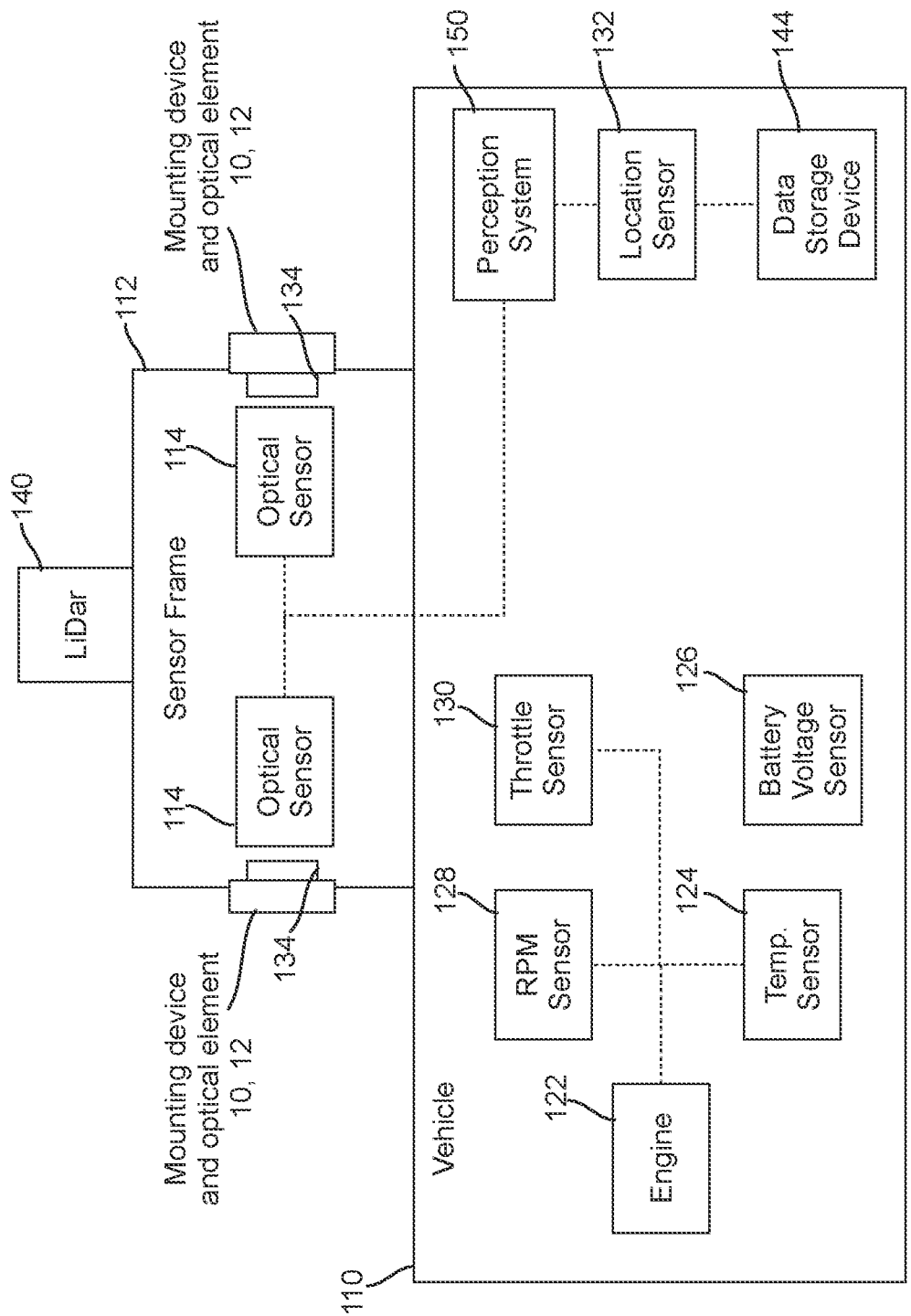
FIG. 1C is a schematic drawing of mechanical and electrical components of the vehicle and sensor frame of FIGS. 1A and 1B.

With reference to FIGS. 1A-1C, a vehicle 110, such as a fully autonomous vehicle or a semi-autonomous vehicle, is illustrated including a sensor housing or sensor frame 112 for supporting an array of optical sensors 114 and other object-detection sensors for detecting objects and/or the environment surrounding the vehicle 110. As shown in FIG. 1A, the vehicle 110 is an automobile, such as a four-door sedan. In other examples, within the scope of the present disclosure, the vehicle 110 can be any other moving form of conveyance that is capable of carrying either human occupants and/or cargo and is powered by any form of energy. For example, the "vehicle" can be a car, truck, van, train, fully autonomous vehicle, semi-autonomous vehicle, bicycle, moped, motorcycle, aircraft, aerial drone, water-going vessel, ship, or boat. As used herein, an "autonomous vehicle" refers to a vehicle having a processor, programming instructions, and drivetrain components that are controllable by the processor without requiring a human operator. An autonomous vehicle may be "fully autonomous" in that it does not require a human operator for most or all driving conditions and functions, or it may be "semi-autonomous" in that a human operator may be required in certain conditions or for certain operations, or that a human operator may override the vehicle's autonomous system and may take control of the vehicle 110.

The vehicle 110 includes a vehicle body 116 and windows 118 enclosing a cabin 120. As will be appreciated by those skilled in the art, the vehicle 110 can include multiple mechanical, electrical, and/or monitoring systems for moving, controlling, and monitoring a condition of the vehicle 110 while in use. For example, as shown schematically in FIG. 1C, the vehicle 110 can include an engine or motor 122 and various sensors for measuring parameters of the vehicle 110. In gas-powered or hybrid vehicles having a fuel-powered engine 122, the sensors may include, for example, an engine temperature sensor 124, a battery voltage sensor 126, an engine rotations-per-minute ("RPM") sensor 128, a throttle position sensor 130, and other sensors as are known in the autonomous vehicle art. In an electric or hybrid vehicle, the vehicle 110 may have an electric motor and sensors, such as battery monitoring sensor (e.g., to measure current, voltage, and/or temperature of the battery), motor current sensor, motor voltage sensor, and/or motor position sensors, such as resolvers and encoders. The vehicle 110 can also include location sensors 132 (e.g., a Global Positioning System ("GPS") device) for tracking vehicle location. The vehicle 110 can also include an on-board perception system 150 for analyzing data from the sensors, in particular, data from the optical sensors 114 to detect objects and obstacles in proximity to the vehicle 110.

As shown in FIGS. 1A and 1B, the vehicle 110 further comprises the sensor housing or frame 112 for supporting the array of optical sensors 114 including openings or apertures 134 positioned around the frame 112. As shown in FIG. 1A, the housing or frame 112 is positioned on the roof of the vehicle 110. In other examples, the frame 114 and/or other structures for supporting optical sensors and other vision sensors can be positioned at many other locations either on the exterior of the vehicle body 116 or inside the vehicle cabin 120. For example, various camera supporting structures, such as tripods, scaffolds, frames, clamps, brackets, housings, and similar support structures, can be used with the vehicle 110 and motorized mounting devices 10 of the present disclosure. An exemplary frame 112 for supporting cameras and other optical and/or vision sensors on a vehicle 110, referred to as the Tiara, which can be used with the motorized mounting devices 10 of the present disclosure, is manufactured by Argo AI of Pittsburgh, Pennsylvania. Those skilled in the art will appreciate that the mounting devices 10 of the present disclosure can also be adapted for use with many other optical sensors, cameras, and support structures within the scope of the present disclosure.

The optical sensors 114 contained within and/or supported by the sensor housing or frame 114 can include components of a conventional digital camera, RGB camera, digital video camera, red-green-blue sensor, far-field camera, and/or depth sensor for capturing visual information and static or video images, as are known in the art. The components of the optical sensors 114 or camera can be adapted to fit within and/or to be mounted to the sensor housing or frame 112. As is known in the art, a digital camera generally includes a charge-coupled device (CCD) or complementary metal-oxide-semiconductor (CMOS) imaging sensor, lens(es), a multifunctional video control chip, and a set of discrete components (e.g., capacitor, resistors, and connectors). An image or series of images is recorded by the imaging sensor and can be processed by the video control chip. Captured images can be stored on computer memory associated with the camera or with other data collection systems of the vehicle 110, such as the data storage device 144 (shown in FIG. 1C). In some examples, the camera or optical sensors 114 can also include multiple image capture features for obtaining stereo images of the environment around the vehicle 110. The stereo-image can be processed to determine depth information for objects in the environment surrounding the vehicle 110. In other examples, the camera can be a wide angle or fish-eye camera, a three-dimensional camera, a light-field camera, or similar devices for obtaining images, as are known in the art.

As shown in FIGS. 1A-1C, the sensor housing or frame 112 includes the multiple openings or apertures 134 for the optical sensors 114 or cameras positioned around the sensor housing or frame 112. The optical sensors 114 and apertures 134 can be oriented in different directions to provide a panoramic view (i.e., a view of from 180 degrees to 360 degrees) of objects and/or the environment surrounding the vehicle 110. The motorized mounting devices 10 holding the optical elements 12 are positioned proximate to the openings or apertures 134 for moving the optical elements 12 over or away from the apertures 134. As described in further detail herein, the motorized mounting devices 10 can include a device housing 14 that is mounted to an outer surface of the frame 112 by, for example, double-sided tape, adhesives, fasteners, or other mechanical or chemical connectors, as are known in the art. In FIGS. 1A and 1B, there is a motorized mounting device 10 proximate to each aperture 134. In other examples, some of the apertures 134 can include mounting devices 10, while others do not, so that image data can be captured both with and without visual distortion.

In some examples, the multiple motorized mounting devices 10 can be in electrical communication and/or connected together so that they can be operated simultaneously and/or by the same controller. For example, each mounting device 10 can be in wired connection with a receiver box or receiving device 136 mounted to the sensor housing or frame 112. As described in further detail herein, the receiver box or receiving device 136 can be in wired or wireless connection with a remote control 138 (shown in FIGS. 4 and 5), allowing a user to actuate the motorized mounting devices 10 independently, simultaneously, sequentially, or in any other manner.

The vehicle 110 can also include a LiDAR sensor system including, for example, cylindrical LiDAR detectors 140 mounted to a top portion of the housing or frame 112. In some examples, the frame 112 can also contain sensors for a radar and/or sonar system (not shown). The frame 112 can also contain environmental sensors (not shown), such as a precipitation sensor and/or ambient temperature sensor.

Motorized Mounting Devices

Figure 2A:
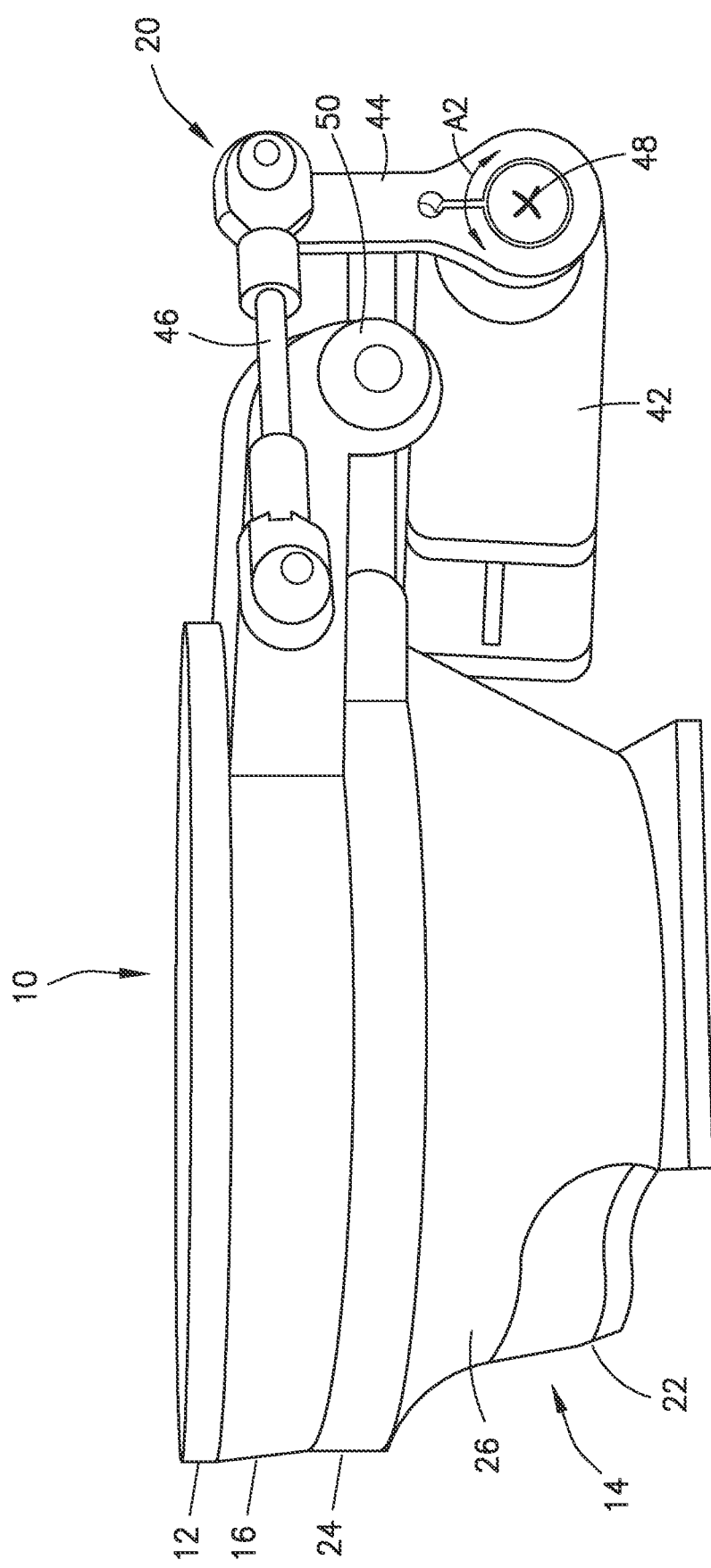
FIG. 2A is a side view of a motorized mounting device in a first or closed position, according to an aspect of the present disclosure.

As previously described, the motorized mounting devices 10 are mounted proximate to the apertures 134 and optical sensors 114, and are configured for selectively positioning optical elements 12 within the field-of-view of an optical sensors 114. Examples of the motorized mounting devices 10 are shown in FIGS. 2A-3C. As shown in FIGS. 2A and 2B, the motorized mounting device 10 can include three separate components, namely a holder 16 for holding the optical element 12 in position over the optical sensor 114, the housing 14 defining an opening, central bore, or interior 18 sized to fit over the aperture 134 of the optical sensor 114, and a motorized actuator 20 for moving the holder 16 between, for example, a first (i.e., a partially closed or fully closed) position, as shown in FIG. 2A, and a second (i.e., a fully open or partially open) position, as shown in FIG. 2B. As used herein, the "first position" or the "closed position" can be a position in which the optical element 12 is at least partially within the field-of-view and/or at least partially blocks the field-of-view of the optical sensor 114. The "second position" or the "open position" can be a position where a larger area of the optical element 12 is outside of the field-of-view of the optical sensor 114 than in the first or closed position and/or where a smaller portion of the field-of-view of the optical sensor 114 is blocked by the optical element 12, than when the optical element 12 is in the first or closed position.

Figure 3A:
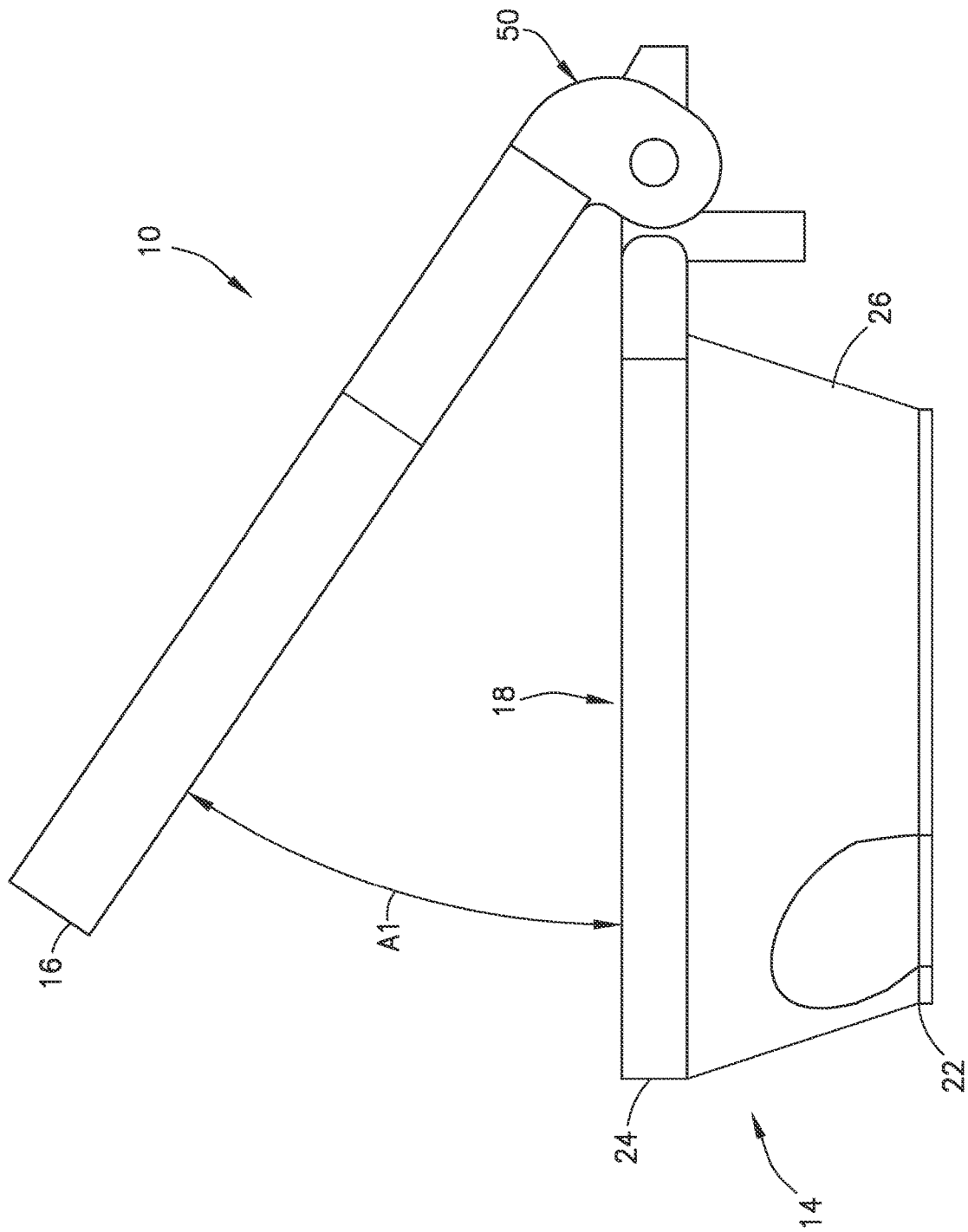
FIG. 3A is a side view of a device housing and holder of a motorized mounting device, according to an aspect of the present disclosure.
Figure 3B:
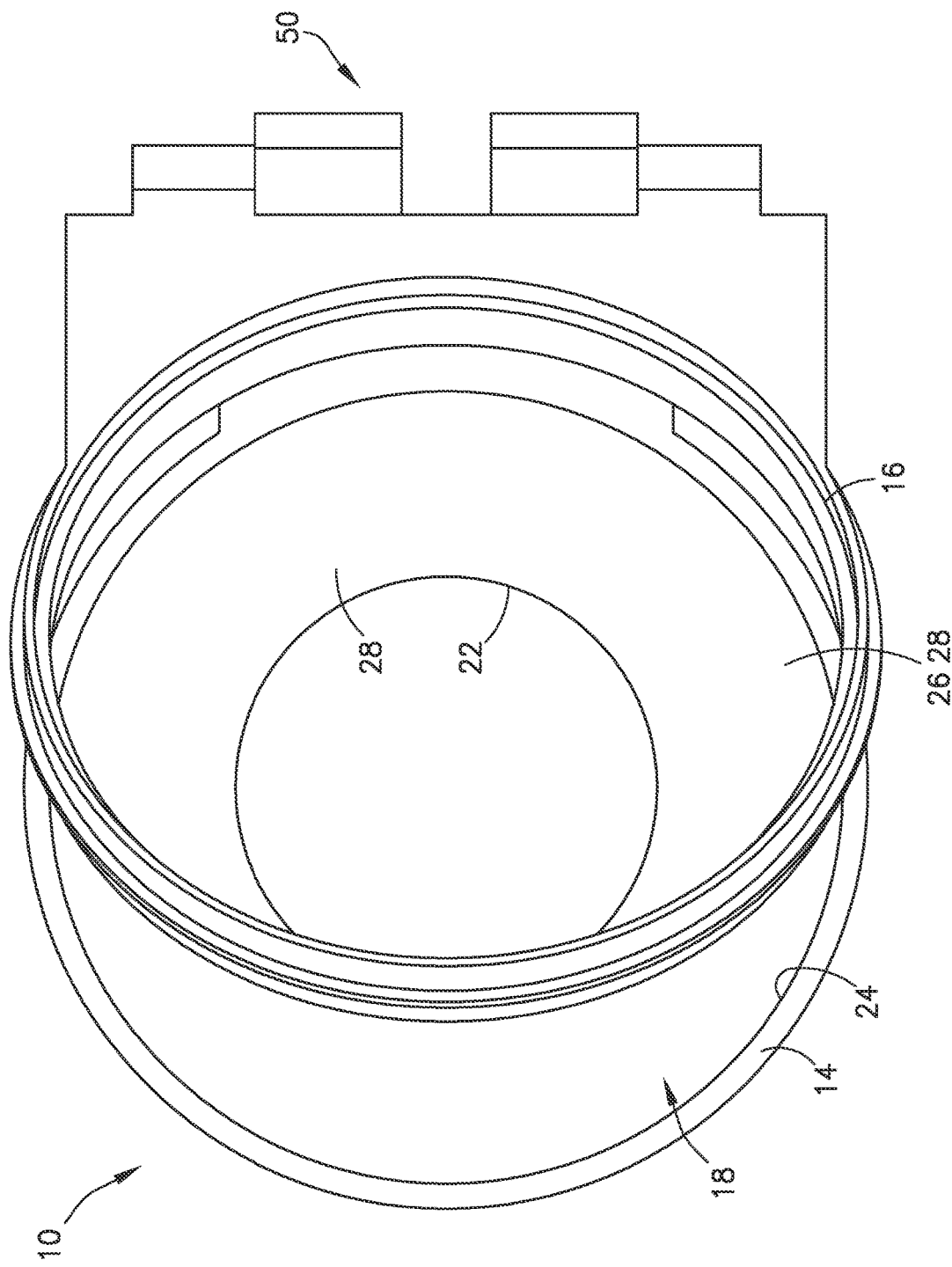
FIG. 3B is a top view of the housing and holder of FIG. 3A.

The housing 14 can be a generally annular structure formed from a rigid material, such as hard plastic or metal, sized to fit over the aperture 134 or opening of the optical sensor 114. As shown in FIGS. 3A-3C, the housing 14 can include a first end 22 configured to be positioned over or proximate to the aperture 134 of the optical sensor 114, a second end 24 opposite the first end 22, and a sidewall 26 extending between the first end 22 and the second end 24. In some examples, the sidewall 26 includes or defines a tapered annular inner surface 28 extending from the first end 22 to the second end 24 of the housing 14.

The holder 16 is an annular structure configured to receive and securely support the optical element 12. The holder 16 can be formed from the same rigid material, such as metal or hard plastic, as the housing 14. Dimensions of the housing 14 and holder 16 can be selected to correspond to specific dimensions of the optical sensor 114 and aperture 134. For example, an inner diameter ID1 (shown in FIG. 3C) of the first end 22 of the housing 14 can be selected to correspond to or match a diameter of the aperture 134 of the optical sensor 114. In a similar manner, the inner diameter ID2 (shown in FIG. 3C) of the second end 24 of the housing and/or an inner diameter ID3 (shown in FIG. 3C) of the holder 16 can be selected to correspond to an outer diameter of the optical element 12. In some examples, the housing 14 and/or holder 16 can be made by additive manufacturing or three-dimensional (3D) printing to a custom size selected based on specific requirements of the sensor housing or frame 112, optical sensor 114, and optical element 12. In other examples, as described in further detail herein, adapter plate(s) 30 can be provided so that the housing 14 can be used with optical sensors 114 and apertures 134 of different sizes.

As shown in FIGS. 2A-3C, the holder 16 can be hingedly connected to the housing 14 at a hinge 50, which allows the holder 16 to swing towards or away from the housing 14, as shown by arrow A1 (in FIGS. 3A and 3C). The holder 16 is positioned such that, when in the first or closed position (shown in FIG. 2A), the optical element is at least partially within the field-of-view of the optical sensor 114. As used herein, "at least partially within the field-of-view" means that, when the holder 16 is in the first or closed position, at least a portion of an image captured by the optical sensor 114 is captured through the optical element 12 and, desirably, includes visual distortions of the optical element 12. In some examples, the holder 16 positions the optical element 12 to fully cover the optical sensor 114 meaning that the entire image captured by the optical sensor 114 is captured through the optical element 12. In other examples, portions (e.g., 75%, 50%, 25%, or 10%) of the captured image is through the optical element 12, while other portions of the captured image are free from distortions of the optical element 12.

The optical element 12 is generally a lens or filter, such as a lens or filter that is used with a conventional digital camera, adapted to include the visual obstructions or distortions described herein. For example, the optical element 12 can include a lens 32 (shown in FIG. 5), such as an 82 mm camera lens or a lens of any other convenient size. The optical element 12 can be sized to be press-fit into the holder 16, thereby securely fixing the optical element 12 to the mounting device 10. In order to change optical elements 12, in some examples, a user can use a small flat tool (such as a small precision flat head screwdriver) to gently pry the optical element 12 away from the holder 16 by pressing a tip of the tool into a gap between the peripheral edge of the optical element 12 and an inner surface of the holder 16.

Figure 5:
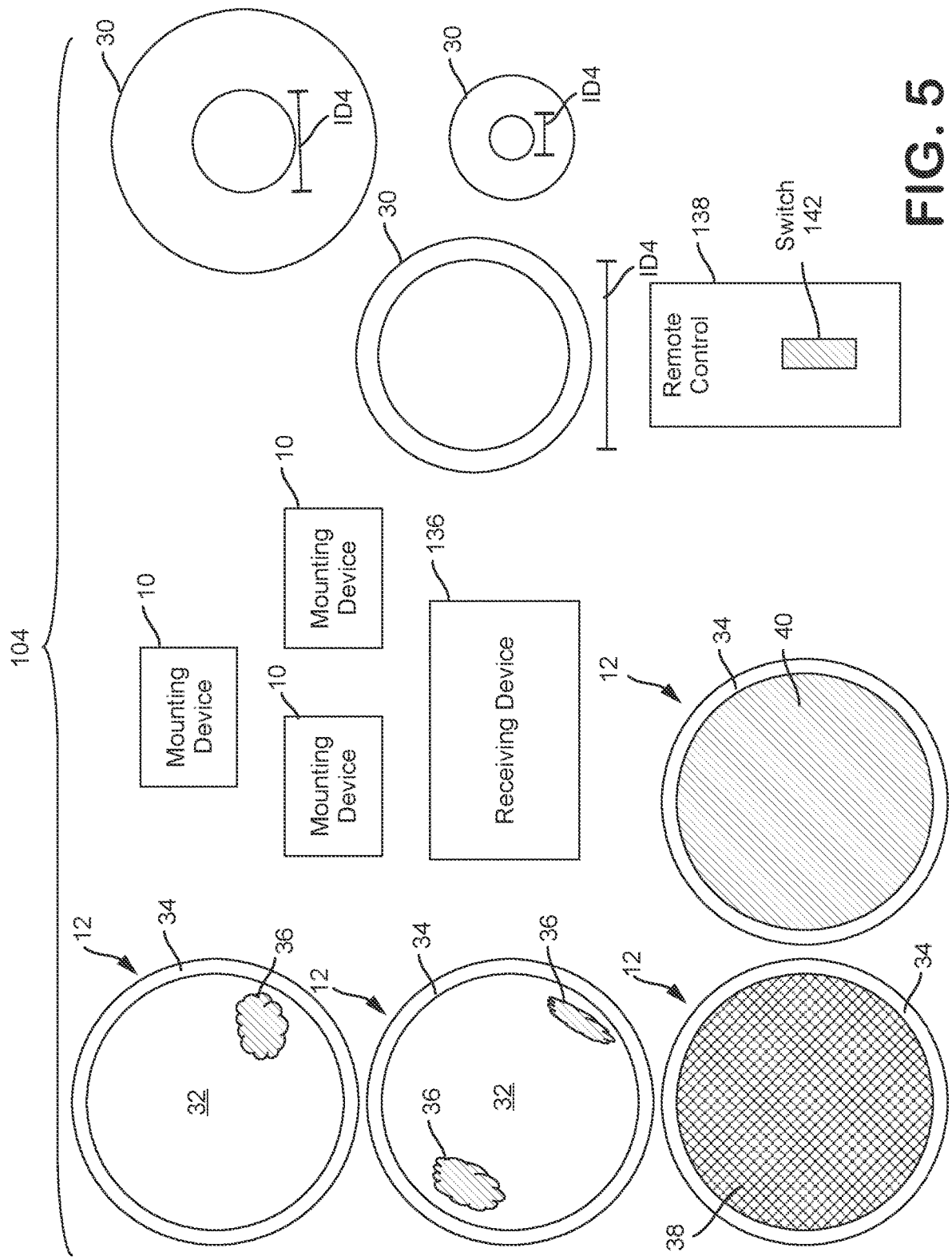
FIG. 5 is a schematic drawing of a kit of parts including a motorized mounting device and associated electronic components, according to an aspect of the present disclosure.

As shown in FIG. 5, the optical element 12 can include, for example, a transparent, translucent, or opaque circular lens 32 enclosed by a mounting ring 34 sized to be engaged to the holder 16. The optical element 12 can also include an obstruction 36 over a portion of the lens 32 positioned to represent obstructions (i.e., dust, dirt, waste, mud, bird poop, scratches, insects, debris, rain drops, or leaves) that may cover a portion of the field-of-view of the optical sensor 114 during real-word use of the vehicle 110 and associated cameras and/or sensors 114. For example, the obstruction 36 can be formed by adhering a coating, paint, tape, or an adhesive to a portion of the lens 32. Alternatively, obstruction(s) 36 can be formed by scratching or otherwise deforming certain portions of the lens 32 to distort images captured through the lens 32. In other examples, the optical element 12 can comprise an opaque lens 38, which emulates situations when the optical sensor 114 is entirely blocked by debris, such that the entire captured image is dark and/or distorted. In other examples, the optical element 12 includes a filter 40, such as a neutral-density (ND) filter, as described in further detail herein.

The motorized actuator 20 is configured to move the holder 16 to adjust the position of the optical element 12 relative to the field-of-view of the optical sensor 114. For example, the motorized actuator 20 can be configured to move the holder 16 between the first or closed position (shown in FIG. 2A) where the optical element 12 is at least partially within the field-of-view of the optical sensor 114, and the second or open position (shown in FIG. 2B) where the optical element 12 is at least partially outside of the field-of-view of the optical sensor 114. For example, the motorized actuator 20 can be configured to pivot, swing, rotate, or slide the holder 16 away from the housing 14, thereby moving the optical element 12 away from the field-of-view of the optical sensor 114.

In some examples, as shown in FIGS. 2A and 2B, the motorized actuator 20 includes a motor, such as a servomotor 42 used, for example, for remote control cars. Suitable servomotors 42 that can be adapted for use with the motorized mounting device 10 of the present disclosure are widely available from numerous manufacturers including, for example, Kpower Technology Co., AMain Sports & Hobbies, Savox USA, and others. The servomotor 42 can be operatively engaged to the holder 16 through linking arms, such as a first arm 44 hingedly connected to a second linking arm 46. The servomotor 42 is configured to rotate the first arm 44, as shown by arrow A2, about a rotation point 48, which causes the second linking arm 46 to move the holder 16 (and optical element 12 engaged thereto) between the first or closed position (shown in FIG. 2A) and the second or open position (shown in FIG. 2B).

Figure 4:
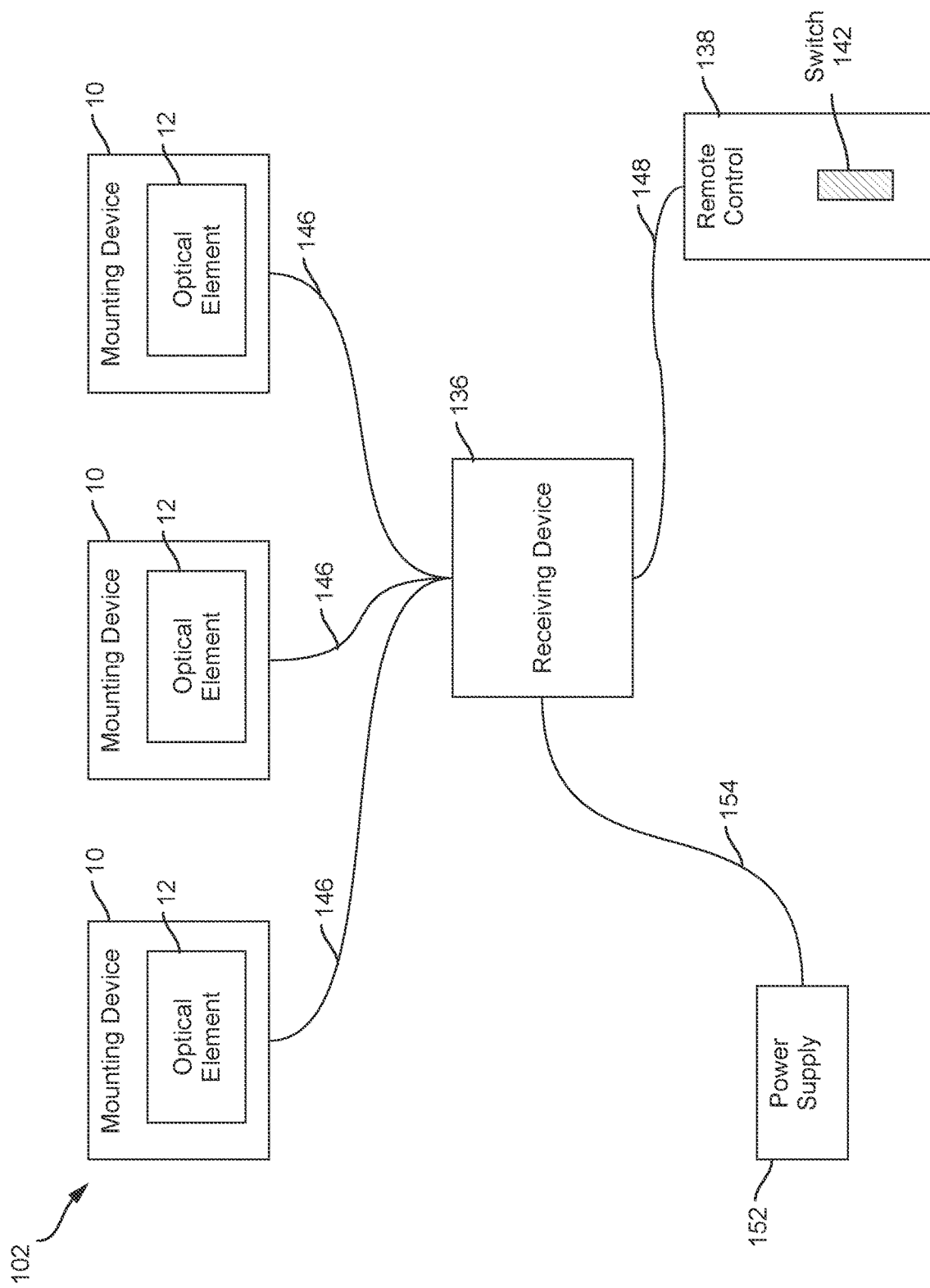
FIG. 4 is a schematic drawing of a system of motorized mounting devices, according to an aspect of the present disclosure.

With reference to FIG. 4, in some examples, multiple motorized mounting devices 10 can be connected together through, for example, the receiver box or receiving device 136 mounted to the sensor housing or frame 112 (as shown in FIG. 1B), thereby forming a system 102 for recording optical sensor 114 image data. In some examples, the system 102 also includes a power supply 152 for providing power for electronics of the receiver box or receiving device 136 and/or for providing power for the servomotors 42 of the mounting devices 10. The power supply 152 can be connected to the receiver box or receiving device 136 by a cable 154, wire, or another suitable electrical connection, as are known in the art. In some examples, the power supply 152 includes rechargeable or disposable batteries for providing power for the receiver box or receiving device 136 and servomotors 42. In other examples, the power supply 152 can be integrated with and/or can receive power from an electrical system of the vehicle 110. For example, the power supply 152 can include an electrical plug configured to be inserted into and receive power from an auxiliary power outlet or cigarette lighter socket of the vehicle 110.

In some examples, the receiver box or receiving device 136 is connected either by wires or wirelessly to the remote control 138. In a simple example, the remote control 138 can include a single button or switch 142 configured to operate the multiple motorized devices 10 simultaneously. When a user presses the button or switch 142, each of the motorized mounting devices 10 moves, for example, from the second or open position to the first or closed position and/or from the first or closed position to the second or open position. In other examples, the remote control 138 can be configured to allow a user to operate the multiple mounting devices 10 independently and/or can be configured to operate the multiple mounting devices 10 in sequence. For example, upon pressing a button of the remote control 138, the mounting devices 10 may open or close one after another according to a predetermined sequence. In some examples, the optical sensors 114 can be connected to a data storage device 144 (shown in FIG. 1C), such as a computer hard drive, for storing images collected by the optical sensors 114. As previously described, the collected image data can be used for testing image analysis software or the vehicle perception system 150 to determine whether such software or systems correctly identifies obstructions represented by the optical elements 12.

With reference to FIG. 5, in some examples, one or more mounting devices 10 can be provided to a user as a kit 104 of parts or a set including components needed to install mounting devices 10 over an aperture 134 of a camera or optical sensor 114 of a vehicle 110. An exemplary kit 104 of parts including components of the mounting device 10 and associated accessories is shown in FIG. 5. Specifically, the kit 104 can include the motorized mounting devices 10, which each include the holder 16, housing 14, and motorized actuator 20. The provided mounting devices 10 can be custom-made devices that are specifically sized for use with a particular camera or optical sensor 114. In other examples, the kit 104 can include one or more adapter plates 30 configured to be positioned between the device housing 14 and the aperture 134, so that the device housing 14 can be used with apertures 134 of different sizes. For example, the adapter plates 30 can be substantially flat annular plates having different inner diameters ID4 that can be positioned between the device housing 14 and the sensor housing or frame 112, so that the device housing 14 can be used with apertures 134 of different sizes. As shown in FIG. 5, the kit 104 can include multiple adapter plates 30 of different common sizes so that the mounting device 10 can be used for different sized cameras or optical sensors 114.

The kit 104 also includes multiple optical elements 12 that can be removably connected to the holder 16 of the mounting device 10 so that image data including different types of obstructions or distortions can be collected. For example, the kit 104 can include optical elements 12 including the transparent or translucent lens 32 having obstructions 36 of different sizes and/or that are positioned over different areas of the lens 32. As previously described, the different obstructions 36 can be representative of different objects (i.e., dirt, dust, bird poop, scratches, mud, waste, insects, or rain drops) that may cover a lens of the camera or optical sensor 114 during real-world use of the vehicle 110 and associated vision sensors. The optical element 12 can also include the entirely opaque lens 38 that represents times when an entire camera lens is obstructed, such as when a leaf covers the entire optical sensor 114 or camera aperture 134. The kit 104 can also include the filter 40, such as the neutral-density filter, which limits intensity of light of all wavelengths passing through the filter 40. The neutral-density filter can be configured to approximate low-light conditions, which occur, for example, when the vehicle 110 is in a tunnel. Accordingly, when the filter 40 is applied, images captured by the optical sensor 114 will be dark, at least for a brief time until light levels for the optical sensor 114 balance. Removal of the filter emulates exiting a tunnel, which suddenly exposes the optical sensor 114 to significantly brighter light (i.e., light of greater intensity). Images captured by the optical sensor 114 upon removal of the filter 40 will be bright, over-exposed, and/or lack contrast, at least until light levels balance.

The kit 104 also includes electronic components for operating the mounting device 10. For example, the kit 104 can include the receiver box or receiving device 136 that is configured to be electrically connected to each of the mounting devices 10 by segments of wires 146. The kit 104 can also include the remote control 138 that is electrically connected to the receiver box by wires 148 or by a wireless data connection.

Methods for Generating Image Data and Testing Software and Perception Systems

The mounting devices 10 of the present disclosure can be used to create datasets of images including images that are at least partially distorted or obscured by the optical elements 12. The created image datasets are used, as previously described, for testing image analysis software or perception systems 150 for a vehicle 110 to determine whether the software and systems correctly identify the distorted images in the generated test dataset and, if necessary, cause the vehicle 110 to take appropriate corrective action. Exemplary perception systems 150 and image processing techniques that can be evaluated using the methods disclosed herein are described, for example, in U.S. Patent Appl. Pub. No. 2021/0107566, entitled "Methods and systems for lane changes using a multi-corridor representation of local route regions" and U.S. Patent Appl. Pub. No. 2021/0108936, entitled "Methods and systems for topological planning in autonomous driving", which are incorporated herein by reference herein in their entireties. A flowchart showing a testing method that can be performed to obtain and analyze a dataset of images is shown in FIG. 6.

Figure 6:
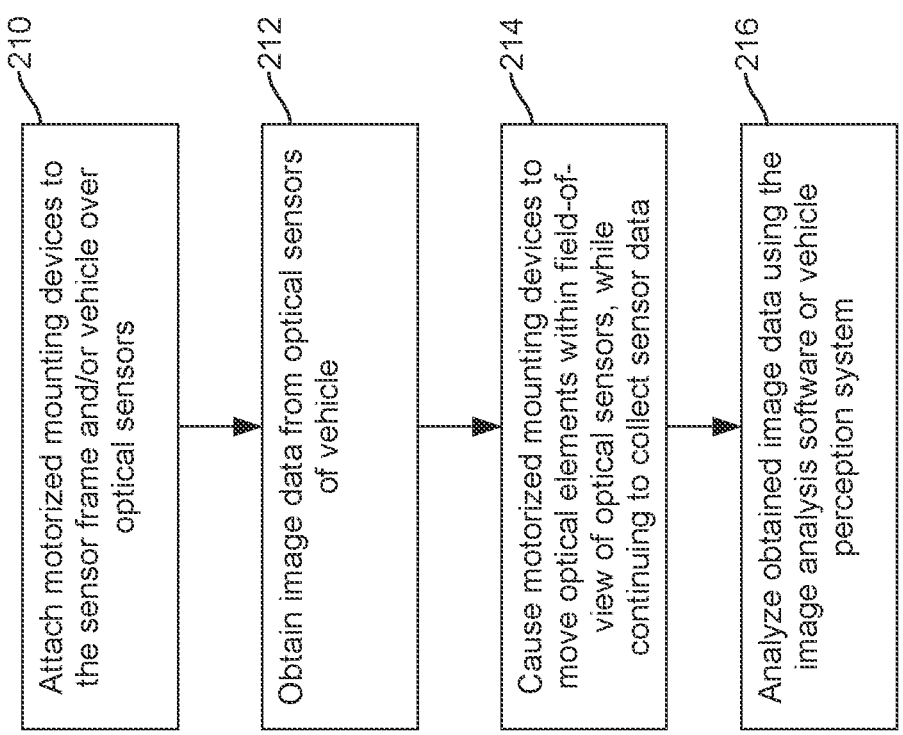
FIG. 6 is a flow chart for a method for testing or evaluating image analysis software that analyzes images collected by an optical sensor of a vehicle, according to an aspect of the present disclosure.

As shown in FIG. 6, at step 210, a user attaches one or more mounting devices 10 to the sensor housing or frame 112 of the vehicle 110, such that the opening, central bore, and/or interior 18 of the device housing 14 of each mounting device 10 is over the aperture 134 of one of the optical sensors 114 of the frame 112. For example, the user may attach double-sided tape (e.g., 3M VHB tape manufactured by 3M Company) to the device housing 14 and/or motorized actuator 20 of the mounting devices 10 and then secure the devices 10 to the sensor housing or frame 114 proximate to an aperture 134 or opening of the optical sensor 114. As previously described, in some examples, the mounting device 10 is custom sized for a particular aperture 134 or opening. In other examples, the user may attach an adapter plate 30 to the device housing 14 corresponding to a size of the aperture 134 or opening. Setting up the mounting device 10 can also include attaching the receiver box or receiving device 136 to a convenient location on the exterior surface of the sensor frame 112 or vehicle 110 and, for example, connecting the mounting devices 10 to the receiving box or receiving device 136 with the wires 146. In a similar manner, setting up the mounting device 10 can also include attaching wires 148 of the remote control 138 to the receiver box or receiving device 136, so that the mounting devices 10 can be operated by the remote control 138.

Once the mounting device or devices 10 are in place proximate to the apertures 134 of the optical sensors 114, at step 212, image data of objects and/or the environment surrounding the vehicle 110 is obtained from the optical sensors 114. During real-world operation of the vehicle 110, image data can be collected as low-resolution data to reduce time required to process or transmit data and/or to reduce computer memory required to store data collected by the optical sensors 114. During real-world operation of the vehicle 110 and optical sensors 114, high resolution image data may only be collected, for example, after faults are detected or at other times when collected image data is expected to be particularly relevant, important, and/or interesting. Datasets including the captured low-resolution data, only occasionally interspersed with high-resolution data, may not be suitable for use in testing image analysis software or vehicle perception systems 150 because some real-life key events may be missed or only captured at a lower resolution than is needed to make confident coding improvements to the software or perception system 150. Accordingly, entire image datasets generated by the methods disclosed herein can be collected as high-resolution data. The high-resolution data can include both images collected when the optical elements 12 are positioned over the optical sensors 114 and images collected when the optical elements 12 are removed from the field-of-view of the optical sensors 114.

At step 214, the method further includes, as the image data is being captured, causing the mounting device or devices 10 to move their respective holders 16 to the first or closed position, thereby positioning the optical element 12 at least partially within the field-of-view of the optical sensor 114, such that at least a portion of the obtained image data is distorted by the optical elements 12. In some examples, causing the mounting device 10 to move the holder 16 to position the optical element 12 at least partially within the field-of-view of the optical sensor 114 occurs manually, actuated by the user. For example, the user can press the button or switch 142 on the remote control 138 to cause one or more of the mounting devices 10 to move the holder 16 from the second or open position to the first or closed position, where the optical element 12 is in the field-of-view of the optical sensor 114. In other examples, moving the holder 16 between the first or closed position and the second or open position occurs automatically. For example, a computer controller associated with the mounting device 10, receiving device or receiving device 136, and/or remote control 138 may actuate the mounting devices 10 at predetermined times according to a predetermined protocol to obtain a dataset including image distortions at particular predetermined times and/or for predetermined durations.

As previously described, in some examples, the optical element 12 is a camera lens 32 including one or more obstructions 36 randomly positioned on the lens 32 to approximate obstructions that may be present over a camera lens during real-world operation of the vehicle 110 and array of optical sensors 114. In such examples, some of the acquired image data can include obscured or disturbed portions caused by the obstructions 36, while other portions of the captured images can appear to be clear. In other examples, the optical element 12 can be the opaque lens 38, representing, for example, when a leaf or another object covers the entire aperture 134 of the optical sensor 114. In such cases, some portions of captured image data may be entirely dark or distorted.

As previously described, in other examples, the optical element 12 is a filter 40, such as the neutral-density filter, that approximates low-light conditions. The neutral-density filter may be used to capture image data that emulates image data that would be obtained when, during real world operation of the vehicle 110, the vehicle is in a dark location, such as a tunnel. In such examples, when the optical element 12 comprising the neutral-density filter is in place, the captured image data is dark (i.e., the intensity of light captured by the optical sensor 114 is reduced for all wavelengths compared to when no filter 40 is present). When a user opens the mounting devices 10, thereby removing the optical element 12 including the filter 40 from the field-of-view of the optical sensor 114, the obtained image data appears to be exceptionally bright, at least until light levels for the optical sensor 114 balance. Desirably, image analysis software should identify such sudden changes in light intensity in captured image data as a normal event that occurs when the vehicle exits a tunnel, and not as an anomaly, malfunction, or other unexpected condition.

At step 216, the method further includes analyzing the obtained image data using the image analysis software or vehicle perception system 150 to determine whether the image analysis software or perception system 150 correctly identifies portions of the image data that have been distorted by optical element 12. In some examples, image processing and analysis can occur in real time during operation of the vehicle 110. In other examples, image analysis can be a post-processing activity where image data is analyzed at a later time to test, evaluate, and/or optimize the software and perception systems 150 or to test new software. For example, different software or algorithms could be used to analyze the same data set, allowing users to assess which software or algorithms are most likely to correctly identify certain image distortions. Generated image datasets can also be used to create simulations including different types of distortions (i.e., with distortions caused by different optical elements 12), so that currently in-use analysis software and systems can be modified and optimized to improve identification for different types of distortions and obstructions.

While different examples of the devices and methods are shown in the accompanying figures and described hereinabove in detail, other examples will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A mounting device, comprising:
   a housing defining an opening sized to fit over an aperture of an optical sensor of a vehicle;
   an optical element configured to be selectively positioned within a field-of-view of the optical sensor, the optical element comprising a lens and an obstruction adhered to a portion of the lens, wherein the obstruction blocks less than an entirety of the field-of-view of the optical sensor;
   a holder for the optical element connected to the housing and positioned such that, when the holder is in a first position, the optical element is at least partially within the field-of-view of the optical sensor and the obstruction of the optical element blocks a portion of the field-of-view of the optical sensor, and in a second position at least a portion of the field-of-view of the optical sensor is unobstructed by the holder and/or by the optical element; and
   a motorized actuator configured to move the holder between the first position and the second position.

2. The mounting device of claim 1, wherein the vehicle comprises a semi-autonomous automobile or a fully autonomous automobile.

3. The mounting device of claim 1, wherein the optical element comprises a neutral-density filter that approximates low-light conditions.

4. The mounting device of claim 1, wherein the optical sensor comprises a digital camera comprising CCD or CMOS sensor.

5. The mounting device of claim 1, wherein the housing comprises a first end configured to be positioned proximate to the aperture of the optical sensor, a second end opposite the first end, and a sidewall comprising a tapered annular inner surface extending from the first end to the second end of the housing.

6. The mounting device of claim 1, wherein the optical element is removably press fit into the holder.

7. The mounting device of claim 1, wherein the holder is pivotally or hingedly connected to the housing, such that moving the holder comprises swinging the holder towards or away from the housing.

8. The mounting device of claim 1, wherein the motorized actuator comprises a motor and a linking arm operatively connected between the motor and the holder, and wherein the motor rotates the linking arm causing the holder to pivot towards or away from the housing, thereby adjusting the position of the optical element relative to the field-of-view of the optical sensor.

9. The mounting device of claim 1, further comprising a remote control operably connected to the motorized actuator configured to selectively actuate the motorized actuator to move the holder relative to the housing.

10. The mounting device of claim 1, further comprising at least one adapter plate sized to mount the housing of the device over optical sensor apertures of different sizes.

11. A kit of parts comprising at least one mounting device of claim 1 and a plurality of optical elements, each of which is configured to be removably mounted to the holder of the at least one mounting device.

12. The kit of claim 11, further comprising a plurality of adapter plates configured to be mounted to the housing for attaching the mounting device to optical sensor apertures of different sizes.

13. The mounting device of claim 1, wherein the obstruction adhered to the lens is configured to represent at least one of dust, dirt, waste, mud, bird poop, scratches, insects, debris, rain drops, or leaves within the field-of-view of the optical sensor.

14. The mounting device of claim 1, wherein the obstruction adhered to the lens comprises at least one of a coating, paint, tape, or an adhesive adhered to the portion of the lens.

15. A vehicle comprising a plurality of optical sensors positioned to obtain images of objects and/or an environment surrounding the vehicle, and a plurality of mounting devices,
    wherein at least one mounting device of the plurality of mounting devices comprises:
        a housing defining an opening sized to fit over an aperture of one of the plurality of optical sensors;
        an optical element configured to be selectively positioned within a field-of-view of the one of the plurality of optical sensors, the optical element comprising a lens and an obstruction adhered to a portion of the lens, wherein the obstruction blocks less than an entirety of the field-of-view of the one of the plurality of optical sensors;
        a holder for the optical element connected to the housing and positioned such that, when the holder is in a first position, the optical element is at least partially within the field-of-view of the one of the plurality of optical sensors and the obstruction of the optical element blocks a portion of the field-of-view of the one of the plurality of optical sensors, and in a second position at least a portion of the field-of-view of the one of the plurality of optical sensors is unobstructed by the holder and/or by the optical element; and
        a motorized actuator configured to move the holder between the first position and the second position.

16. The vehicle according to claim 15, wherein each of the plurality of mounting devices comprises:
    a housing defining an opening sized to fit over an aperture of one of the plurality of optical sensors;
    an optical element configured to be selectively positioned within a field-of-view of the one of the plurality of optical sensors, the optical element comprising a lens and an obstruction adhered to a portion of the lens, wherein the obstruction blocks less than an entirety of the field-of-view of the one of the plurality of optical sensors;
    a holder for the optical element connected to the housing and positioned such that, when the holder is in a first position, the optical element is at least partially within the field-of-view of the one of the plurality of optical sensors and the obstruction of the optical element blocks a portion of the field-of-view of the one of the plurality of optical sensors, and in a second position at least a portion of the field-of-view of the one of the plurality of optical sensors is unobstructed by the holder and/or by the optical element; and
    a motorized actuator configured to move the holder between the first position and the second position.

17. The vehicle of claim 15, wherein the vehicle comprises a semi-autonomous automobile or a fully autonomous automobile.

18. The vehicle of claim 15, wherein the optical element comprises a neutral-density filter that approximates low-light conditions.

19. The vehicle of claim 15, wherein the one of the plurality of optical sensors comprises a digital camera comprising CCD or CMOS sensor.

20. A mounting device, the mounting device comprising:
    a housing defining an opening sized to fit over an aperture of the optical sensor;
    an optical element configured to be selectively positioned within a field-of-view of the optical sensor, the optical element comprising a lens and an obstruction adhered to a portion of the lens;
    a holder for the optical element connected to the housing and positioned such that, when the holder is in a first position, the optical element is at least partially within the field-of-view of the optical sensor and the obstruction of the optical element blocks a portion of the field-of-view of the optical sensor; and
    a motorized actuator configured to move the holder to adjust the position of the optical element relative to the field-of-view of the optical sensor,
    wherein the housing comprises a first end configured to be positioned proximate to the aperture of the optical sensor, a second end opposite the first end, and a sidewall comprising a tapered annular inner surface extending from the first end to the second end of the housing, and
    wherein the holder is connected to the housing by a hinge configured to open, thereby moving the optical element away from the second end of the housing as the motorized actuator moves the holder from the first position to a second position.

\* \* \* \* \*